United States Patent
Lee et al.

(10) Patent No.: US 11,804,189 B2
(45) Date of Patent: Oct. 31, 2023

(54) DISPLAY DEVICE, METHOD FOR GENERATING OFFSET CURRENT VALUES AND CURRENT OFFSETTING SYSTEM

(71) Applicant: Radiant Opto-Electronics Corporation, Kaohsiung (TW)

(72) Inventors: Lian-Young Lee, Kaohsiung (TW); Chun-Yi Sun, Kaohsiung (TW); Jon-Hong Lin, Kaohsiung (TW); Peng-Hsiang Wu, Kaohsiung (TW); Hung-Pao Wu, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/058,276

(22) Filed: Nov. 23, 2022

(65) Prior Publication Data
US 2023/0154422 A1    May 18, 2023

Related U.S. Application Data

(63) Continuation of application No. PCT/CN2021/131383, filed on Nov. 18, 2021.

(51) Int. Cl.
*G09G 3/34*     (2006.01)
*G09G 3/20*     (2006.01)

(52) U.S. Cl.
CPC ......... *G09G 3/3426* (2013.01); *G09G 3/2096* (2013.01); *G09G 2320/0686* (2013.01); *G09G 2320/0693* (2013.01); *G09G 2360/16* (2013.01)

(58) Field of Classification Search
CPC .............. G09G 3/2096; G09G 3/3426; G09G 2320/0686; G09G 2320/0693; G09G 2360/16
See application file for complete search history.

(56) References Cited

U.S. PATENT DOCUMENTS

| | | | |
|---|---|---|---|
| 10,290,266 B2 * | 5/2019 | Kurokawa | G09G 3/342 |
| 11,024,002 B2 * | 6/2021 | Isikdogan | G06F 18/217 |
| 11,114,047 B2 * | 9/2021 | Kurokawa | G09G 3/20 |
| 11,676,547 B2 * | 6/2023 | Fukai | G09G 3/3413 |
| | | | 345/102 |
| 11,699,217 B2 * | 7/2023 | Isikdogan | G06V 10/764 |
| | | | 382/103 |
| 2019/0333456 A1 | 10/2019 | Lim | |
| 2023/0112481 A1 * | 4/2023 | Lee | G09G 3/3275 |
| | | | 345/214 |

FOREIGN PATENT DOCUMENTS

| | | |
|---|---|---|
| CN | 101673529 A | 3/2010 |
| CN | 102332242 A | 1/2012 |
| CN | 103700348 A | 4/2014 |
| TW | 201102630 A | 1/2011 |
| TW | 202123214 A | 6/2021 |

* cited by examiner

*Primary Examiner* — Gene W Lee
(74) *Attorney, Agent, or Firm* — CKC & Partners Co., LLC (57) ABSTRACT

A method for generating offset current values includes: setting a current setting sequence which includes multiple current setting values; driving a light emitting unit and measuring a current value of the light emitting unit; establishing a recurrent neural network (RNN) including an input layer, a hidden layer and an output layer; and inputting the current value into the hidden layer, inputting the current setting values into the input layer sequentially, and obtaining offset values from the output layer sequentially. The offset values correspond to the current setting values respectively.

14 Claims, 5 Drawing Sheets

DISPLAY DEVICE, METHOD FOR GENERATING OFFSET CURRENT VALUES AND CURRENT OFFSETTING SYSTEM

RELATED APPLICATIONS

This application is a continuation of International application No. PCT/CN2021/131383, filed Nov. 18, 2021 which is herein incorporated by reference.

BACKGROUND

Field of Invention

The present disclosure relates to a method for generating offset values for a backlight module of a display device.

Description of Related Art

A display is one of the most common electronic devices in modern life and used in various scenarios and situations. Some displays include a backlight module to provide a light source through a plurality of light-emitting diodes. The brightness of the light-emitting diodes can be independently controlled based on the technology of local dimming, thereby improving the contrast ratio of the display. The light-emitting diodes are driven according to preset parameters in conventional technologies. However, due to factors such as process variation, the preset parameters may not necessarily provide preset brightness of light. Therefore, how to correct these parameters is a topic of concern to those skilled in the art.

SUMMARY

Embodiments of the present disclosure provide a method for generating offset current values for a display device. The display device includes a display panel and a backlight module. The display panel includes multiple regions, the backlight module includes multiple light emitting units, and each of the regions corresponds to at least one of the light emitting units. The light emitting units are driven by currents to serve as a backlight source of the regions of the display panel. The method includes: establishing a current setting sequence including multiple current setting values, driving a first light emitting unit of the light emitting units, and measuring a first current value of the first light emitting unit; establishing a recurrent neural network including input layer, a hidden layer, and an output layer; and inputting the first current value into the hidden layer and sequentially inputting the current setting values into the input layer so as to obtain multiple offset values from the output layer sequentially. The offset values correspond to the current setting values respectively.

In some embodiments, the method further includes: obtaining one of the offset values, and driving the first light emitting unit according to the obtained offset value.

In some embodiments, an operation of the recurrent neural network includes performing a following equation.

$$s(d)=f_2(W\times f_1(V\times t(d)+U\times m(d+1)))$$

d is one of multiple dimming levels. t(d) is one of the current setting values. The dimming levels are arranged in descending order in the current setting sequence. s(d) is one of the offset values, and m(d+1) is an input of the hidden layer. When the dimming level d is equal to a maximum dimming level, m(d+1) is the first current value. W, V and U are weights, and $f_1$ and $f_2$ are activation functions.

In some embodiments, the current setting values correspond to multiple driving values, and the method further includes: in a training stage, for each of the current setting values, driving one of the light emitting units according to the corresponding driving value to obtain a second current value, adjusting the corresponding driving value based on a negative feedback control such that the second current value meets the corresponding current setting value. The adjusted driving value and the second current value corresponding to the maximum dimming level constitute a training sample.

In some embodiments, the activation functions $f_1$ and $f_2$ are Sigmoid functions, rectified linear units, or hyperbolic tangent functions. The dimming levels are arranged as an arithmetic sequence.

From another aspect, embodiments of the present disclosure provide a display device including a display panel, a backlight module and at least one circuit. The display panel includes multiple regions. The backlight module includes multiple light emitting units. Each of the regions corresponds to at least one of the light emitting units. The light emitting units are driven by currents to serve as a backlight source of the regions of the display panel. The circuit includes an offset lookup table containing multiple offset values corresponding to multiple dimming levels respectively. The offset values are built by a recurrent neural network. The at least one circuit is configured to obtain one of the offset values, and generate a corrected current according to the obtained offset value to drive a first light emitting unit of the light emitting units.

In some embodiments, the at least one circuit includes a time controller and a microcontroller unit. The time controller is configured to calculate driving values corresponding to the first light emitting unit according to a local dimming algorithm. The microcontroller unit stores the offset lookup table.

From another aspect, a current offsetting system includes the display device and an electrical device. The recurrent neural network is performed by the electrical device and includes an input layer, a hidden layer, and an output layer. The electrical device is configured to generate offset current values based on a calibration procedure including: establishing a current setting sequence including multiple current setting values, driving a first light emitting unit of the light emitting units, and measuring a first current value of the first light emitting unit; inputting the first current value into the hidden layer and sequentially inputting the current setting values into the input layer so as to obtain multiple offset values from the output layer sequentially, in which the offset values correspond to the current setting values respectively; and building the offset lookup table corresponding to the first light emitting unit according to the offset values.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
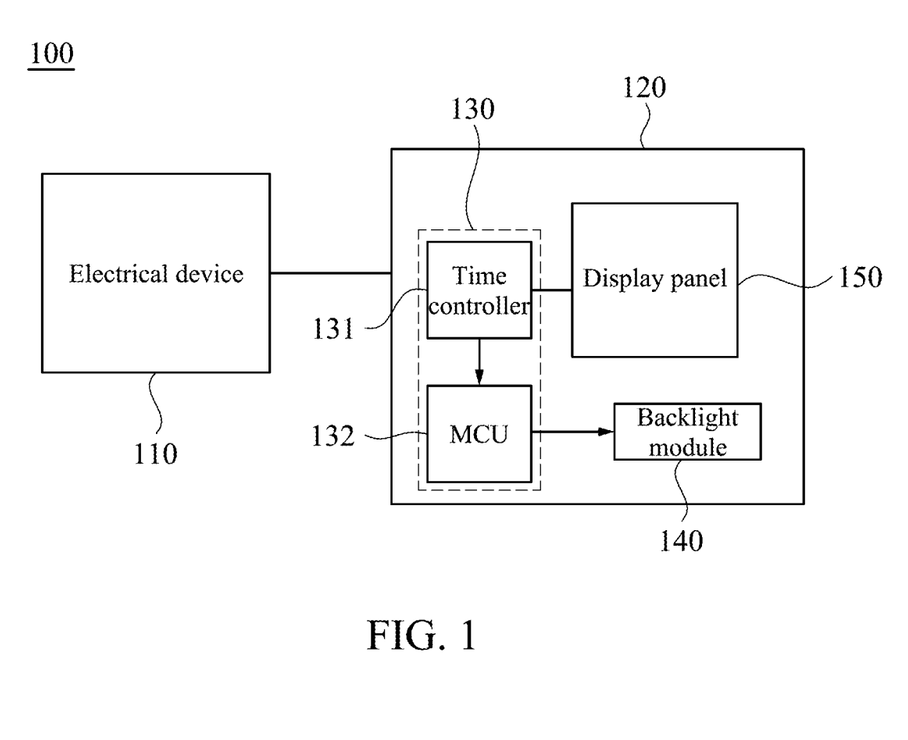
FIG. 1 is a schematic diagram of a current offsetting system in accordance with an embodiment.
Figure 2:
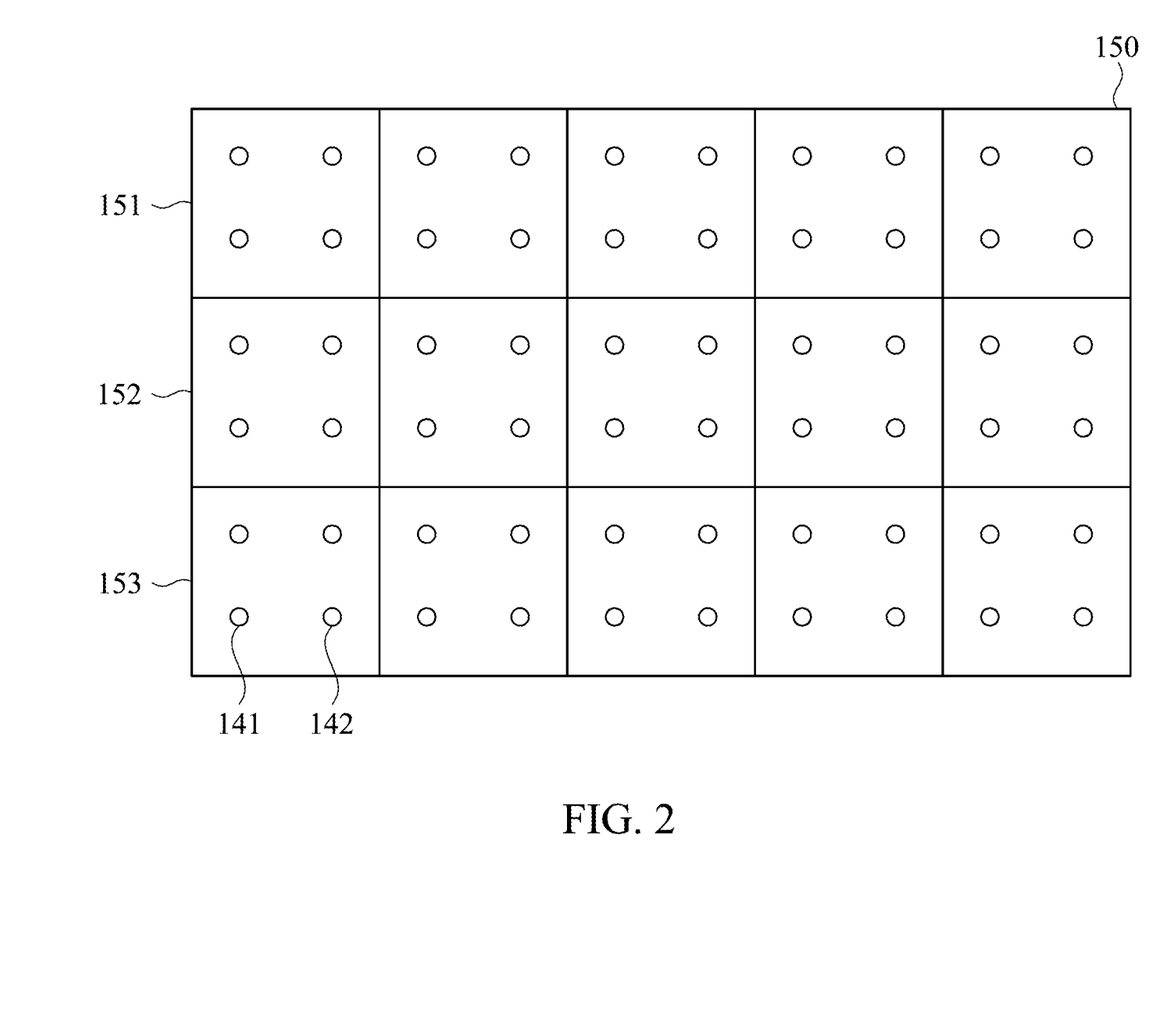
FIG. 2 is a schematic diagram of regions of the display panel and the corresponding light emitting units in accordance with an embodiment.

FIG. 1 is a schematic diagram of a current offsetting system in accordance with an embodiment. Referring to FIG. 1, a current offsetting system 100 includes an electrical device 110 and a display device 120. The electrical device 110 may be a personal computer, a server or any electrical device with computation capability. The display device 120 includes a circuit 130, a backlight module 140, and a display panel 150. The circuit 130 includes a time controller 131 and a microcontroller unit (MCU) 132. The microcontroller unit 132 may be replaced with a field programmable gate array (FPGA) which is not limited in the disclosure. The backlight module 140 includes multiple light emitting units such as light emitting diodes which are driven by currents of the backlight module 140 to serve as a backlight source. The display panel 150 is, for example, a liquid crystal display panel. FIG. 2 is a schematic diagram of regions of the display panel and the corresponding light emitting units in accordance with an embodiment. In the embodiment of FIG. 2, the display panel 150 includes 15 regions (e.g. regions 151-153), and each region corresponds to four light emitting units (e.g. light emitting units 141-142). The brightness of each light emitting unit can be controlled by the magnitude of the current flowing through the corresponding light emitting unit for increasing the contrast ratio of a frame. For example, if a portion of the frame in a particular region is relatively dark, the brightness of the corresponding light emitting units are decreased; and if a portion of the frame in that particular region is relatively bright, the brightness of the corresponding light emitting units are increased. FIG. 2 is merely an example, and the number of the regions in the display panel 150 and the number of the light emitting units corresponding to one region are not limited in the disclosure.

Referring to FIG. 1, when a frame is to be rendered, the time controller 131 calculates a dimming level of each region of the display panel 150 according to a local dimming algorithm. The dimming level represents the brightness of the backlight source. The time controller 131 also calculates a driving value of each light emitting unit based on the dimming level. The driving value is used to generate a particular magnitude of current to drive the light emitting units. In some embodiments, the driving value is positively correlated to the dimming level. For example, the dimming level has 8 digits in a range of 0 to 255, and the driving value has 10 digits in a range of 0 to 1023. The mapping between the dimming level and the driving value may be linear or non-linear which is not limited in the disclosure. Due to factors such as process variation, a preset driving value may not necessarily drive the light emitting unit to produce required brightness, and hence the preset driving value needs to be corrected. The microcontroller unit 132 stores multiple offset lookup tables, and each offset lookup table corresponds to one light emitting unit. Each offset lookup table stores multiple offset values corresponding to the driving values. The time controller 131 can read the offset lookup table according to the calculated driving value so as to obtain the corresponding offset value, and drive the corresponding light emitting unit based on this offset value. Consequently, the light emitting unit will produce required brightness. A method for generating offset current values is provided. The method is executed by the electrical device 110 in which a recurrent neural network (RNN) is used to generate the said offset values.

Figure 3:
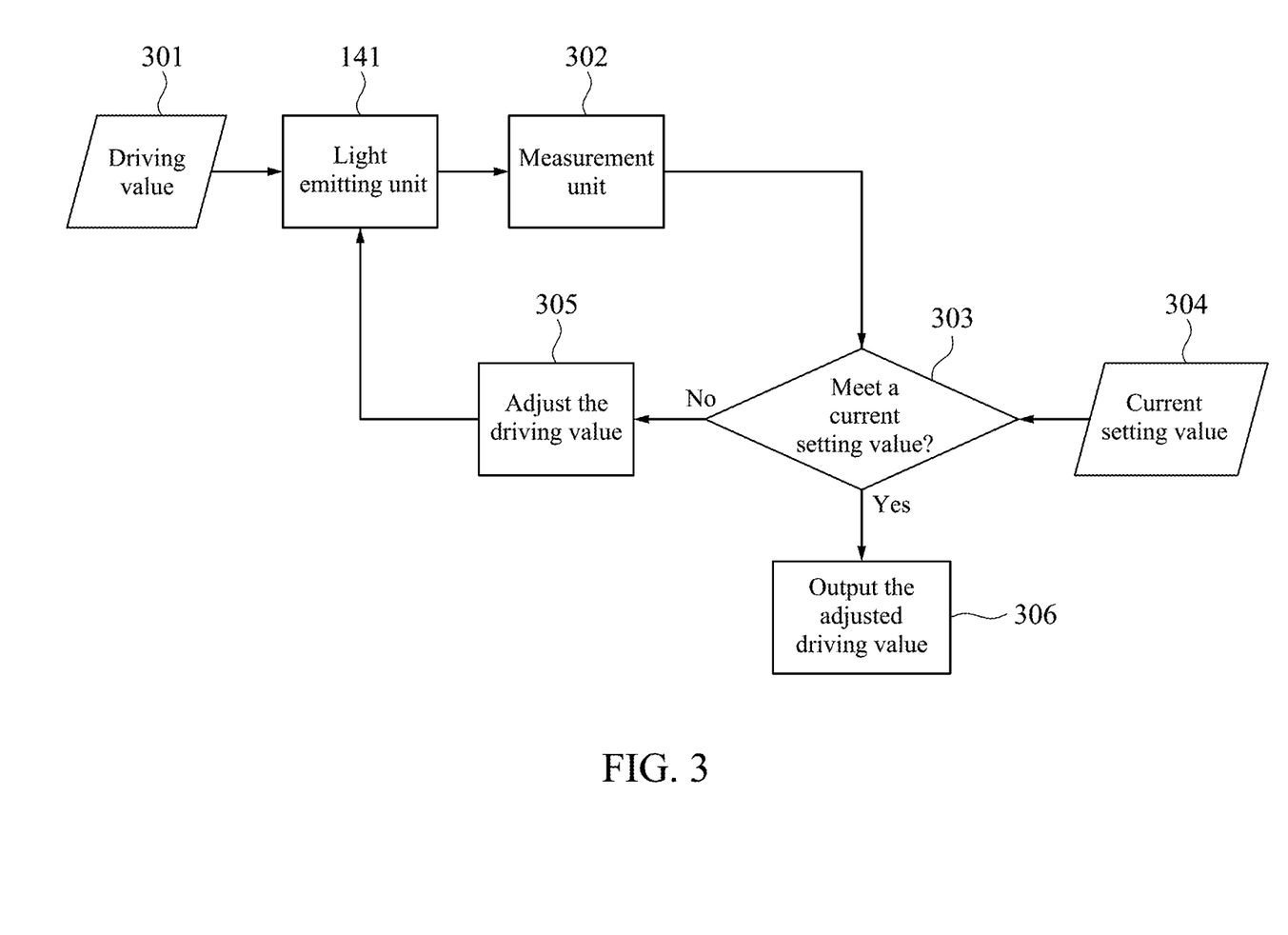
FIG. 3 is a flow chart of generating offset current values of training samples in accordance with an embodiment.

FIG. 3 is a flow chart of generating offset values of training samples in accordance with an embodiment. Referring to FIG. 3, the light emitting unit 141 is taken as an example. In a training stage, the light emitting unit 141 is driven according to a driving value 301, and then a current value of the light emitting unit 141 is measured by the measurement unit 302 such as a current meter or a power meter. In step 303, it is determined if the measured current value meets a current setting value 304. The current setting value 304 is a target current magnitude which may be an objective value calculated by a program of the electrical device 110, or a subjective value set by the user, or a value of the specification asked by the manufacturer of the electrical device 110. The current setting value 304 corresponds to the driving value 301. For example, the driving value is equal to "995", and the current setting value is equal to 64 milliampere (mA). That is, 64 mA is sufficient to drive the light emitting unit 141 to produce required brightness of the driving value "995". It is determined if the measured current value is close to 64 mA enough. In some embodiments, whether the measured current value is equal to the current setting value 304 is determined in the step 303. In some embodiments, whether the difference between the measured current value and the current setting value 304 is within a range is determined in the step 303. If the result of the step 303 is "No", then the driving value is adjusted in a step 305. For example, if the measured current value is less than the current setting value 304, then the original driving value 301 is increased a little as a new driving value; if the measured current value is greater than the current setting value 304, then the original driving value 301 is decreased a little as a new driving value. The light emitting unit 141 is then driven by the new driving value, and the step 303 is repeated. When the measured current value meets the current setting value in the step 303, the adjusted driving value is outputted in the step 306. In other words, the driving value 301 is adjusted based on negative feedback control such that the measured current value meets the current setting value 304 corresponding to the driving value 301. Note that the negative feedback control is performed for each driving value. If there are 256 dimming levels, there will be 256 corresponding driving values, and the negative feedback control is performed 256 times for each driving value. The adjusted driving values serve as a portion of a training sample.

The following Table 1 includes dimming levels, current setting values, original driving values, measured current values, and adjusted driving values of a light emitting unit.

TABLE 1

| dimming level d | current setting value t(d) | original driving values si(d) | Measured current value m(d) | adjusted driving values s(d) |
|---|---|---|---|---|
| 255 | 64 | 995 | 65.3 | 993 |
| 254 | 63.75 | 991 | 65 | 989 |
| 253 | 63.5 | 988 | 64.8 | 985 |
| ... | ... | ... | ... | ... |
| 1 | 0.25 | 3 | 0.35 | 3 |
| 0 | 0 | 0 | 0 | 0 |

For example, referring to the second row of the Table 1 (i.e. the dimming level is equal to 255), the current setting value is equal to 64 mA, the original driving values is equal to 995, the measure current value is 65.3 mA which is greater than the current setting value of 64 mA, and thus the driving value is adjusted into 993, and so on for the other dimming levels. In the following description, d denotes the dimming level, t(d) denotes the current setting value corresponding to the dimming level d, si(d) denotes the original (i.e. preset) driving value corresponding to the dimming level d, m(d) denotes the measured current value corresponding to the dimming level d, and s(d) denotes the adjusted driving value corresponding to the dimming level d. In the embodiments, the current value m(d) of one dimming level (e.g. d=255) is used to predict the adjusted driving values s(d) of all dimming levels. Since the measurement of the current value m(d) needs certain amount of time, it will take too much time for measuring the current values m(d) of all dimming levels. In the disclosure, the adjusted driving values s(d) are rapidly estimated by means of prediction.

Figure 4:
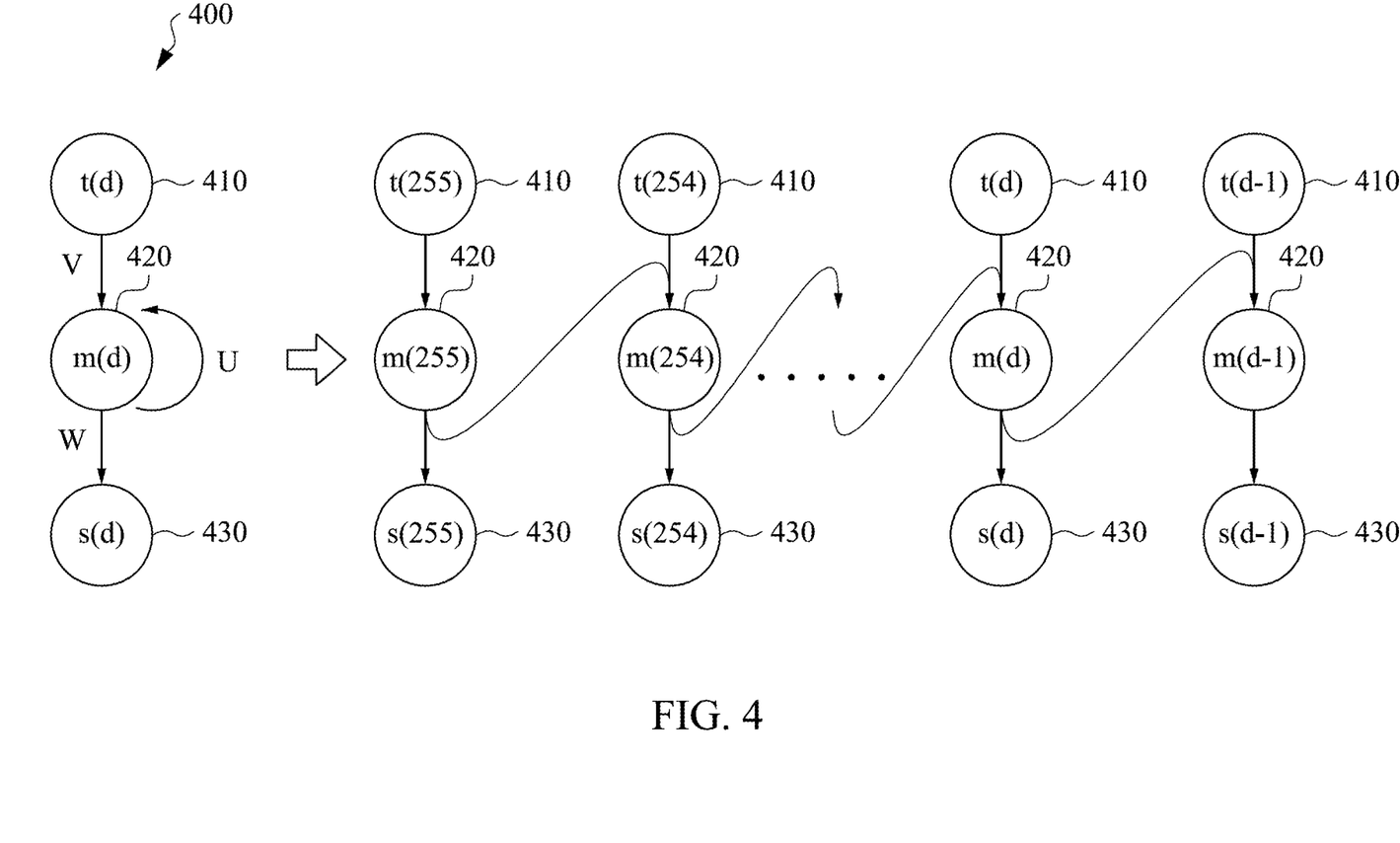
FIG. 4 is a schematic diagram of a recurrent neural network in accordance with an embodiment.

FIG. 4 is a schematic diagram of a recurrent neural network in accordance with an embodiment. Referring to FIG. 4, a recurrent neural network 400 includes an input layer 410, a hidden layer 420, and an output layer 430. The input of the input layer 410 is the current setting value t(d), the feature value m(d) of the hidden layer 420 is calculated as the following Equation 1 where V and U are weights to be trained.

$$m(d)=V \times t(d)+U \times m(d+1) \quad \text{[Equation 1]}$$

The output of the output layer 430 is the driving value s(d) calculated as the following Equation 2 where W is a weight to be trained. Substituting the Equation 1 into the Equation 2 yields the following Equation 3.

$$s(d)=W \times m(d) \quad \text{[Equation 2]}$$

$$s(d)=W \times (V \times t(d)+U \times m(d+1)) \quad \text{[Equation 3]}$$

In addition, an activation function $f_1$ is included between the input layer 410 and the hidden layer 420, and an activation function $f_2$ is included between the hidden layer 420 and the output layer 430. These two activation functions may be Sigmoid functions, Rectified Linear Units (ReLU) or hyperbolic tangent functions which are not limited in the disclosure. The output of the two activation functions is within a limited range and the output curve is smooth without outputting positive infinity or negative infinity like the arithmetic sequence did, and thus a correction stability of the driving values s(d) is improved. Under this premise, the Equation 3 can be rewritten into the following Equation 4 by adding the activation functions.

$$s(d)=f_2(W \times f_1(V \times t(d)+U \times m(d+1))) \quad \text{[Equation 4]}$$

The current setting values t(255)-t(0) are arranged in a sequence. The driving values s(d) outputted from the recurrent neural network 400 are also arranged in a sequence. In general, the recurrent neural network 400 can be expressed in an expanded way as shown in FIG. 4. For example, when the input is t(d), the output is s(d), and so on. Note that the dimming levels d are arranged as an arithmetic sequence in a descending order. That is, the current setting values t(255)-t(0) are sequentially inputted into the input layer 410. The feature value m(d) is calculated based on the feature value m(d+1) of the previous iteration. When processing the greatest dimming level (i.e. d=255), the feature value m(256) is equal to the measured current value (e.g. 65.3 mA in the second row of Table 1) by driving the light emitting unit based on the driving value si(255). Therefore, only the current value m(256) needs to be measured, and the other values m(255)-(0) are calculated based on the Equation 1. A training sample at least includes the current value m(256) and all the adjusted driving values s(255)-s(0).

Figure 5:
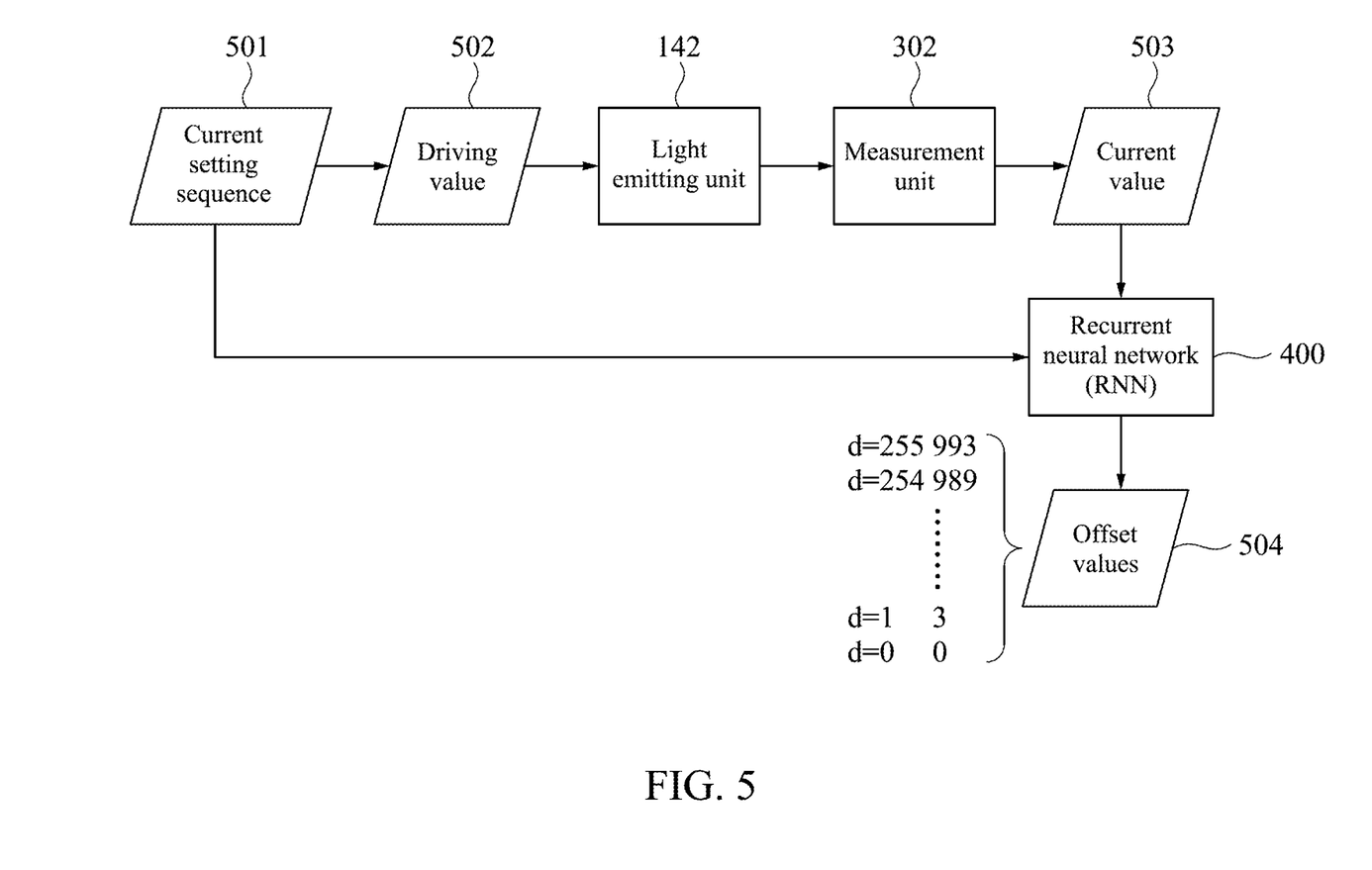
FIG. 5 is a flow chart of a calibration procedure in accordance with an embodiment.

Each light emitting unit can provide a training sample. The trained recurrent neural network 400 is used to predict adjusted driving values. To be specific, FIG. 5 is a flow chart of a calibration procedure in accordance with an embodiment. The calibration procedure is performed by the electrical device 110 for building an offset lookup table for a particular light emitting unit. Referring to FIG. 5, take the light emitting unit 142 as an example, a current setting sequence 501 is established to include current setting values t(255)-t(0) in which the dimming levels are arranges as an arithmetic sequence in descending order from "255" to "0". Next, a driving value 502 corresponding to one of the current setting value is obtained. In the embodiment, the driving value si(255) corresponding to the maximum dimming level (i.e. d=255) is obtained. The light emitting unit 142 is driven according to the obtained driving value 502, and then a current value 503 of the light emitting unit 142 is measured by the measurement unit 302. The current value 503 is then inputted into the hidden layer of the recurrent neural network 400 as m(d+1) while the current setting values t(255)-t(0) are sequentially inputted into the input layer, and then offset values 504 are sequentially obtained from the output layer. The offset values 504 are used to build the offset lookup table. For example, the offset lookup table records the offset values (e.g. "999", "989" . . . , "3", "0") corresponding to the dimming levels (e.g. "255" to "0"). The offset lookup table may be stored in the microcontroller unit 132 for further operations. For example, when the dimming level is equal to "254", the offset values "989" is obtained by accessing the offset lookup table, and then the backlight module 140 generates a corrected current based on this offset value of "989" to drive the light emitting unit 142 as a backlight source of at least one region of the display panel. That is, the current for each region is corrected to provide uniform brightness to avoid uneven brightness across the regions. The embodiment may cooperate with a local dimming algorithm to ensure desired brightness of each region is achieved.

In the flow chart of FIG. 5, all offset values can be obtained by measuring the current value 503 only once. Conventional technology needs to measure the current value of each driving value to generate the offset values based on negative feedback control. The approach described in the embodiment can save a lot of time.

In the aforementioned embodiment, the driving value 502 is equal to the driving value si(255) corresponding to the maximum dimming level. However, the driving value corresponding to any dimming level may be adopted in other embodiments, and the corresponding current value should be adopted in the training stage. For example, if the measured current value m(128) is inputted into the hidden layer, then the current setting values for the input layer may be in the order of t(127)-t(0) and (255)-t(128). In other words, the current setting value t(127) has to be the first input. People in the art should be able to devise different current setting sequences based on the disclosure. The disclosure is not limited to the aforementioned embodiments.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for generating offset current values for a display device comprising a display panel and a backlight module, wherein the display panel comprises a plurality of regions, the backlight module comprises a plurality of light emitting units, each of the regions corresponds to at least one of the light emitting units, and the light emitting units are driven by currents to serve as a backlight source of the regions of the display panel, and the method comprises:
    establishing a current setting sequence comprising a plurality of current setting values, driving a first light emitting unit of the light emitting units, and measuring a first current value of the first light emitting unit;
    establishing a recurrent neural network comprising an input layer, a hidden layer, and an output layer; and
    inputting the first current value into the hidden layer and sequentially inputting the current setting values into the input layer so as to obtain a plurality of offset values from the output layer sequentially, wherein the offset values correspond to the current setting values respectively.

2. The method of claim 1, further comprising:
    obtaining one of the offset values, and driving the first light emitting unit according to the obtained offset value.

3. The method of claim 1, wherein an operation of the recurrent neural network comprises a following equation:

$$s(d) = f_2(W \times f_1(V \times t(d) + U \times m(d+1)))$$

wherein d is one of a plurality of dimming levels, t(d) is one of the current setting values, the dimming levels are arranged in descending order in the current setting sequence, s(d) is one of the offset values, and m(d+1) is an input of the hidden layer,
wherein when the dimming level d is equal to a maximum dimming level, m(d+1) is the first current value,
wherein W, V and U are weights, and $f_1$ and $f_2$ are activation functions.

4. The method of claim 3, wherein the current setting values correspond to a plurality of driving values, and the method further comprises:
    in a training stage, for each of the current setting values, driving one of the light emitting units according to the corresponding driving value to obtain a second current value, adjusting the corresponding driving value based on a negative feedback control such that the second current value meets the corresponding current setting value,
    wherein the adjusted driving value and the second current value corresponding to the maximum dimming level constitute a training sample.

5. The method of claim 3, wherein the activation functions $f_1$ and $f_2$ are Sigmoid functions, rectified linear units, or hyperbolic tangent functions, and the dimming levels are arranged as an arithmetic sequence.

6. A display device comprising:
    a display panel comprising a plurality of regions;
    a backlight module comprising a plurality of light emitting units, wherein each of the regions corresponds to at least one of the light emitting units, the light emitting units are driven by currents to serve as a backlight source of the regions of the display panel; and
    at least one circuit comprising an offset lookup table storing a plurality of offset values corresponding to a plurality of dimming levels respectively, wherein the offset values are generated by a recurrent neural network, the at least one circuit is configured to obtain one of the offset values, and generate a corrected current according to the obtained offset value to drive a first light emitting unit of the light emitting units.

7. The display device of claim 6, wherein the at least one circuit comprises a time controller and a microcontroller unit, the time controller is configured to calculate driving values corresponding to the first light emitting unit according to a local dimming algorithm, and the microcontroller unit stores the offset lookup table.

8. The display device of claim 6, wherein the recurrent neural network comprising an input layer, a hidden layer, and an output layer, an operation of the recurrent neural network comprises a following equation:

$$s(d) = f_2(W \times f_1(V \times t(d) + U \times m(d+1)))$$

wherein d is one of the dimming levels, t(d) is one of a plurality of current setting values, the dimming levels are arranged in descending order in a current setting sequence, s(d) is one of the offset values, and m(d+1) is an input of the hidden layer,
wherein when the dimming level d is equal to a maximum dimming level, m(d+1) is a first current value,
wherein W, V and U are weights, and $f_1$ and $f_2$ are activation functions.

9. The display device of claim 8, wherein the activation functions $f_1$ and $f_2$ are Sigmoid functions, rectified linear units, or hyperbolic tangent functions, and the dimming levels are arranged as an arithmetic sequence.

10. A current offsetting system comprising the display device of claim 6 and an electrical device, wherein the recurrent neural network is performed by the electrical device and comprises an input layer, a hidden layer, and an output layer, and the electrical device is configured to generate offset current values based on a calibration procedure comprising:
    establishing a current setting sequence comprising a plurality of current setting values, driving a first light emitting unit of the light emitting units, and measuring a first current value of the first light emitting unit;
    inputting the first current value into the hidden layer and sequentially inputting the current setting values into the input layer so as to obtain a plurality of offset values from the output layer sequentially, wherein the offset values correspond to the current setting values respectively; and
    building the offset lookup table corresponding to the first light emitting unit according to the offset values.

11. The current offsetting system of claim 10, wherein an operation of the recurrent neural network comprises a following equation:

$$s(d)=f_2(W\times f_1(V\times t(d)+U\times m(d+1)))$$

wherein d is one of a plurality of dimming levels, t(d) is one of the current setting values, the dimming levels are arranged in descending order in the current setting sequence, s(d) is one of the offset values, and m(d+1) is an input of the hidden layer, wherein when the dimming level d is equal to a maximum dimming level, m(d+1) is the first current value, wherein W, V and U are weights, and $f_1$ and $f_2$ are activation functions.

12. The current offsetting system of claim 11, wherein the activation functions $f_1$ and $f_2$ are Sigmoid functions, linear rectifier units, or hyperbolic tangent functions, and the dimming levels are arranged as an arithmetic sequence.

13. The current offsetting system of claim 10, wherein the calibration procedure further comprises:

obtaining one of the offset values, and driving the first light emitting unit according to the obtained offset value.

14. The current offsetting system of claim 10, wherein the at least one circuit comprises a time controller and a microcontroller unit, the time controller is configured to calculate driving values corresponding to the first light emitting unit according to a local dimming algorithm, and the microcontroller unit stores the offset lookup table.

* * * * *